(12) United States Patent
Fumo

(10) Patent No.: US 11,726,006 B2
(45) Date of Patent: Aug. 15, 2023

(54) APPARATUS FOR TESTING THE FIRMNESS OF INFANT SLEEP SURFACES

(71) Applicant: Nelson Fumo, Tyler, TX (US)

(72) Inventor: Nelson Fumo, Tyler, TX (US)

( * ) Notice: Subject to any disclaimer, the term of this patent is extended or adjusted under 35 U.S.C. 154(b) by 173 days.

(21) Appl. No.: 17/384,305

(22) Filed: Jul. 23, 2021

(65) Prior Publication Data
US 2023/0021954 A1    Jan. 26, 2023

(51) Int. Cl.
*G01M 99/00*    (2011.01)

(52) U.S. Cl.
CPC ................. *G01M 99/001* (2013.01)

(58) Field of Classification Search
None
See application file for complete search history.

(56) References Cited

U.S. PATENT DOCUMENTS

| | | | | |
|---|---|---|---|---|
| 3,786,676 A | * | 1/1974 | Korolyshun | G01N 3/16 73/818 |
| 5,845,805 A | * | 12/1998 | Ragland | A21B 3/13 220/573.1 |
| 2005/0217498 A1 | * | 10/2005 | Miller | A47J 43/20 99/426 |
| 2016/0207429 A1 | * | 7/2016 | Fitzpatrick | B60N 2/686 |
| 2019/0285515 A1 | * | 9/2019 | Larson | G01M 99/001 |

* cited by examiner

*Primary Examiner* — Paul M. West

(57) ABSTRACT

An apparatus to test, at home, the firmness of a sleep surface to be used by an infant is disclosed. The apparatus is based on the home version of the Australian/New Zealand Standard AS/NZS 8811.1:2013. The apparatus comprises two pieces, one piece is the support to hold a defined weight, and the other piece is used as a scale to visualize how much the piece with the weight sinks into the sleep surface.

1 Claim, 2 Drawing Sheets

APPARATUS FOR TESTING THE FIRMNESS OF INFANT SLEEP SURFACES

FIELD OF THE INVENTION

The present disclosure pertains to instruments for testing. In particular, the present disclosure is directed to the apparatus and methods for testing sleeping surfaces for infants.

BACKGROUND

One of the recommendations to create a safe sleep environment for a baby is that babies should sleep on a firm and flat surface. However, as stated in the foreword of the Australian/New Zealand Standard AS/NZS 8811.1:2013 Methods of testing infant products, Method 1: Sleep surfaces—Test for firmness, "Expert advice to caregivers, nationally and internationally, specifies a 'firm' sleep surface without quantifying the minimum acceptable firmness or method for determining it." The objective of the standard AS/NZS 8811.1:2013 "is to provide a test method for use by industry and regulators that will minimize the risk of infant asphyxiation by identifying sleep surfaces that exhibit less than a specified firmness." The testing apparatus described in the standard is heavy and large, which make it impractical for use at home. Therefore, a simplified method, using things that can be found in a home, is promoted for people to apply as alternative. This alternative method is still cumbersome, but the present invention facilitates the application of the simplified method.

SUMMARY

It is recommended that infants sleep on a firm and flat surface. However, the firmness of the sleep surface is not defined and there is not a formal device that parents can use at home to check if a surface satisfies the recommended firmness. It seems that the only formal reference presenting a test method on the firmness of sleep surfaces in infant products is the Australian/New Zealand Standard AS/NZS 8811.1:2013. A home equivalent test, which uses 12 computer CDs and two one-liter milk cartons, is found on internet. To make the home test more accessible and accurate, the present invention is disclosed. The invention, that has two parts, requires only a two-liter soda to conduct the test. One part is the support of the two-litter soda. The other part is used as a scale to visualize how much the piece with the soda sinks into the sleep surface to identify if the sleep surface exhibit less than a specified firmness.

DETAILED DESCRIPTION

Figure 1B:
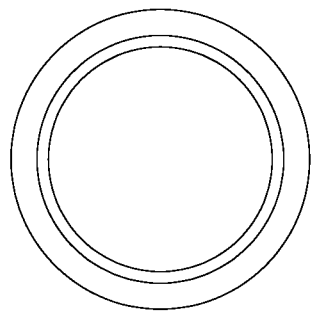
FIG. 1B Shows the top view of the support base (10) of the firmness apparatus.
Figure 2B:
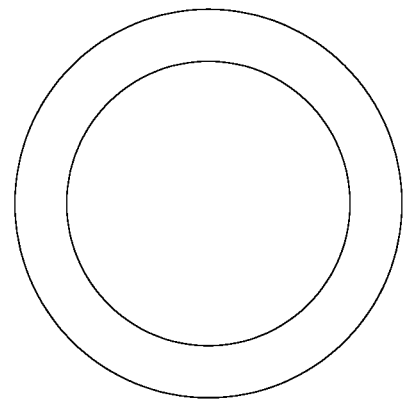
FIG. 2B Shows the top view of the measuring ring (20) of the firmness apparatus.
Figure 1A:
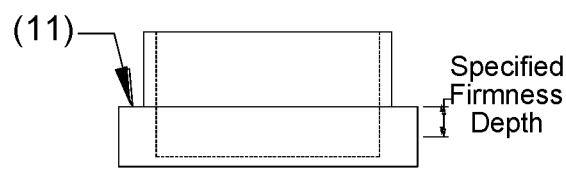
FIG. 1A Shows the lateral view of the support base (10) of the firmness apparatus and the reference surface on it (11).
Figure 2A:
FIG. 2A Shows the lateral view of the measuring ring (20) of the firmness apparatus and the reference surface on it (21).
Figure 3B:
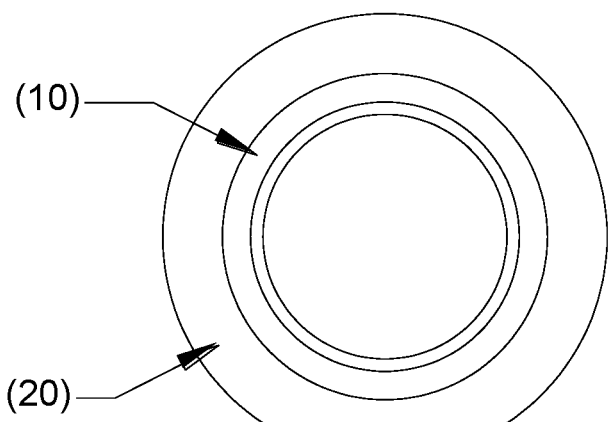
FIG. 3B Shows the top view of the firmness apparatus.
Figure 3A:
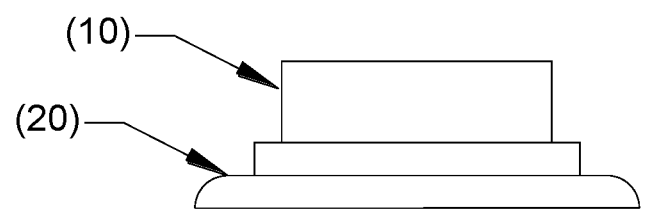
FIG. 3A Shows the lateral view of the firmness apparatus.
Figure 4A:
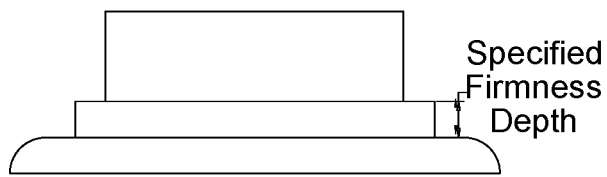
FIG. 4A Shows the firmness apparatus as if it were on a hard surface and indicates the height defining the specified firmness.
Figure 4B:
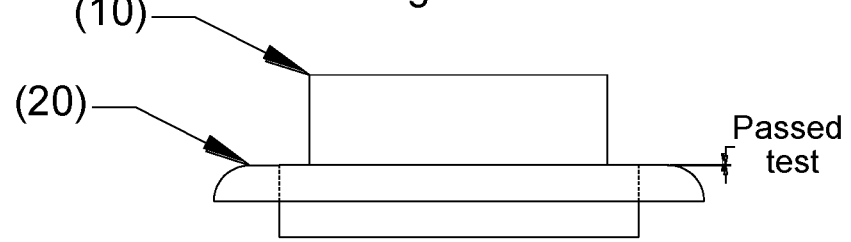
FIG. 4B Shows the firmness apparatus as if it were placed on a sleep surface that passed the test but at the limit sinking of the support base to pass the test.
Figure 4C:
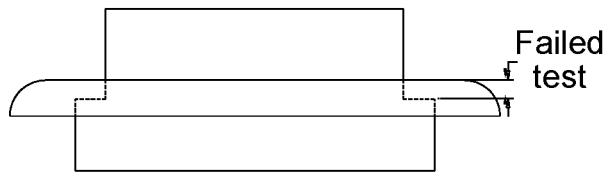
FIG. 4C Shows the firmness apparatus as if it were placed on a sleep surface that failed the test.
Figure 5:
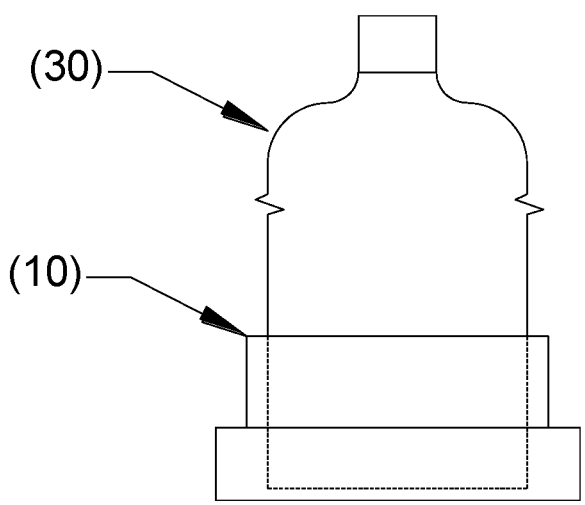
FIG. 5 Shows the support base (10) holding a two liters bottle of soda (30).

The firmness apparatus is composed of two parts, the support base (10) and the measuring ring (20). The support base accommodates a household product with a defined weight, such as a bottle of soda, and it can slide through the measuring ring (20). The measuring ring (20) has a very small weight and therefore will not sink into the sleep surface when placed on top of it. Also, the measuring ring has such a dimension, external diameter, that it will not be affected by the

What is claimed is:

1. An apparatus to test the firmness of a sleeping surface, comprising a hollow circular support base (10) and a measuring ring (20);

wherein the hollow circular support base (10), which can accommodate a household product with a defined weight, slides on the inside of the measuring ring (20);

wherein the hollow circular support base (10) has a step made from a larger outer diameter and the top of the step defines a reference surface (11) for the support base;

wherein the top surface of the measuring ring (20) defines a reference surface (21) for the measuring ring (20);

wherein the position of the reference surface (11), of the hollow circular support base (10), with respect to the reference surface (21), of the measuring ring (20), defines if the sleeping surface has a firmness that is within the firmness specified by the apparatus; if the reference surface (11) of the hollow circular support base (10) falls below the reference surface (21) of the measuring ring (20), the sleeping surface does not pass the firmness test;

wherein the hollow circular support base (10) can have a printed scale and the position of the reference surface (21), of the measuring ring (20), on the printed scale gives a measure of the firmness of the sleeping surface.

* * * * *